United States Patent [19]

Easton

[11] Patent Number: 4,853,699

[45] Date of Patent: Aug. 1, 1989

[54] METHOD FOR CANCELLING AZIMUTH AMBIGUITY IN A SAR RECEIVER

[75] Inventor: James K. Easton, Marina del Rey, Calif.

[73] Assignee: Hughes Aircraft Company, Los Angeles, Calif.

[21] Appl. No.: 119,938

[22] Filed: Nov. 13, 1987

[51] Int. Cl.$^4$ ............................................. G01S 13/90
[52] U.S. Cl. .................................................. 342/25
[58] Field of Search ......................................... 342/25

[56] References Cited

U.S. PATENT DOCUMENTS

| | | | |
|---|---|---|---|
| 4,064,510 | 12/1977 | Chabah | 342/25 |
| 4,134,113 | 1/1979 | Powell | 342/25 |
| 4,244,036 | 1/1981 | Raven | 342/25 |
| 4,387,373 | 6/1983 | Lonquemare, Jr. | 342/25 |
| 4,563,686 | 1/1986 | Boles | 342/25 |
| 4,626,860 | 12/1986 | Tricoles et al. | 342/25 |

Primary Examiner—Thomas H. Tarcza
Assistant Examiner—Mark Hellner
Attorney, Agent, or Firm—Leonard A. Alkov; A. W. Karambelas

[57] ABSTRACT

A method for cancelling azimuth, i.e., doppler ambiguity, in a SAR receiver on board a moving craft, e.g., an aircraft, which permits a lower PRF, without causing range ambiguity. Radar returns are received on board the craft with an antenna having first and second apertures to produce corresponding first and second return signals. The first return signal is processed over a given time period to generate a first series of component SAR signals representing radar returns from respective cells of an azimuth-range grid. The second return signal is processed over the given time period to generate a second series of component SAR signals representing radar returns from the respective cells of the azimuth-range grid. The component signals, individually weighted, are additively combined to produce a third series of resultant SAR signals representing the radar returns from the respective cells of the azimuty-range grid. The weighted additive combination of the component signals resolves azimuth ambiguity, even though the PRF is less than the minimum PRF prescribed by conventional wisdom.

4 Claims, 2 Drawing Sheets

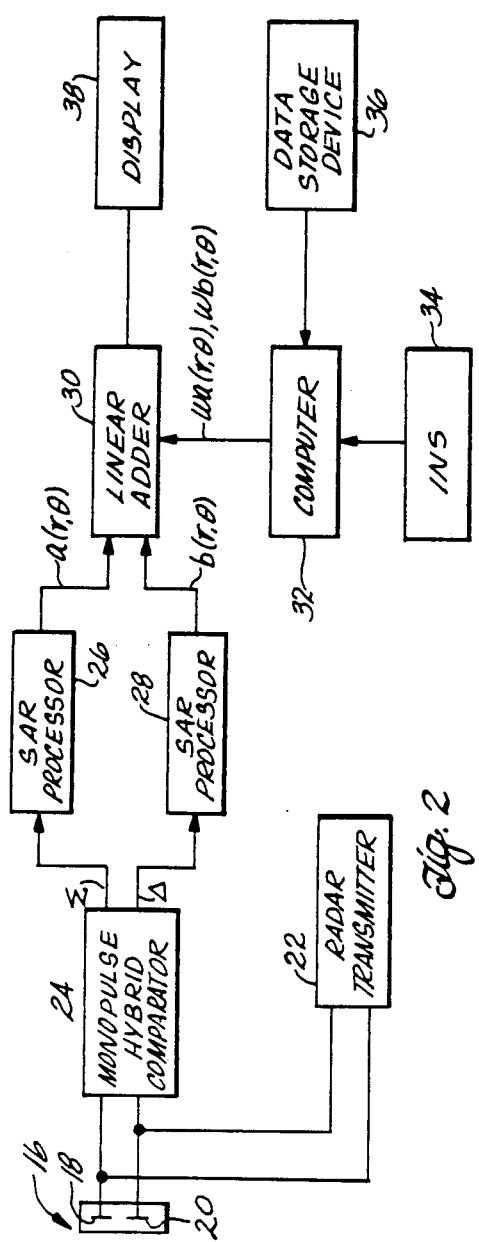
Fig. 2
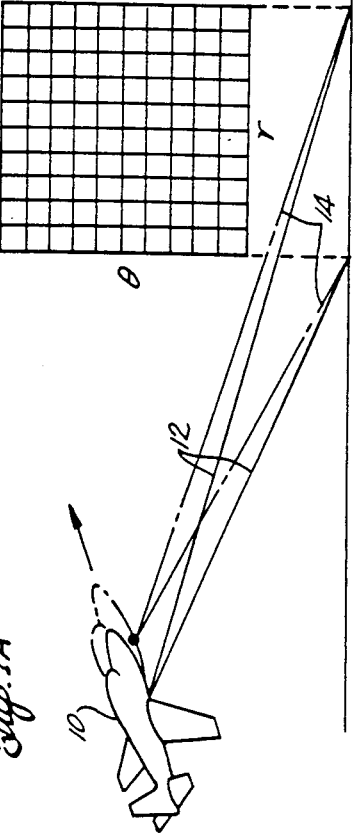
Fig. 1B
Fig. 1A

METHOD FOR CANCELLING AZIMUTH AMBIGUITY IN A SAR RECEIVER

FIELD OF THE INVENTION

This invention relates to radar systems and, more particularly, to a method for cancelling azimuth ambiguity in a Synthetic Array Radar (SAR).

DESCRIPTION OF RELATED ART

Synthetic array radar (SAR) is employed for high resolution ground mapping. Radar equipment on board a moving aircraft crosses radar signals returned from an area of ground beam to be mapped and produces on a display an azimuth-range grid of the ground area under surveillance. In this technique, the effect of antenna length is increased by utilizing the motion of the aircraft, hence the term "synthetic array." Specifically, the effect of antenna length is increased by combining the return signals from a number of pulses transmitted by the radar equipment while the aircraft is moving relative to the ground area under scrutiny to form each azimuth line of the grid being displayed. This technique permits very high azimuth resolution to be achieved.

The choice of Pulse Repetition Frequency (PRF) of SAR radar equipment is limited by the configuration of the equipment and the operation conditions. Specifically, the PRF must be set low enough to avoid range ambiguities, yet high enough to avoid doppler ambiguities. To avoid doppler ambiguities, the PRF must be larger than a value which is a function of the velocity of the aircraft carrying the radar equipment, the wavelength of the transmitted pulses, the effective length of the antenna, and the squint angle of the antenna beam. This restricts the range of the radar equipment that can be achieved without incurring range ambiguity.

SUMMARY OF THE INVENTION

The invention is a method for eliminating azimuth ambiguity, i.e., doppler ambiguity, in a SAR receiver on board a moving craft, e.g., an aircraft. As a result, a lower PRF can be used without azimuth ambiguity degrading the map. Specifically, radar returns are intercepted on board the craft with an N-antenna having first and second subapertures to produce corresponding first and second return signals. The first return signal is processed over a given time period to generate a first series of component SAR signals representing radar returns from respective cells of N-azimuth-range grid. The second return signal is processed over the given time period to generate a second series of component SAR signals representing radar returns from the respective cells of the grid. The first and second series of component SAR signals are individually weighted and are additively combined to produce a third series of resultant SAR signals representing the radar returns from the respective cells of the azimuth-range grid. The weighted additive combination of the component signals eliminates azimuth ambiguities, even though the PRF is less than the minimum PRF prescribed by conventional wisdom. The invention permits a reduction in PRF approaching 33⅓% without encountering azimuth ambiguity.

BRIEF DESCRIPTION OF THE DRAWINGS

The features of a specific embodiment of the best mode contemplated of carrying out the invention are illustrated in the drawings, in which:

FIG. 1A is a diagram of an aircraft and the beam of radar equipment carried thereby;

FIG. 1B is a diagram of an azimuth-range grid mapping the ground area under surveillance by the aircraft of FIG. 1A;

FIG. 2 is a schematic block diagram of apparatus for practicing the invention;

DETAILED DESCRIPTION OF THE PREFERRED EMBODIMENTS

Figure 3:
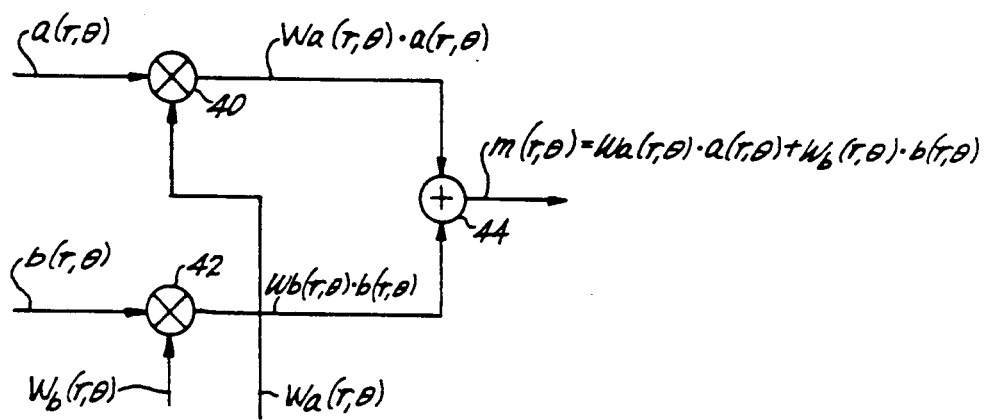
FIG. 3 is a schematic diagram of the linear adder of FIG. 2.

In FIG. 1A, radar equipment (not shown) on board a moving aircraft 10 transmits radar pulses through an antenna whose beam 12 illuminates the area of ground 14. As described below, the radar equipment on board aircraft 10 generates SAR signals representing radar returns from respective cells of an azimuth-range grid within ground area 14, which is represented in FIG. 1B. The grid comprises of first crossing lines of azimuth $\theta$ and increments of range r that form the individual cells mapped by the radar equipment. Antenna beam 12 illuminates only part of the ground area 14 at only one time. It will be understood therefore that, as represented by the dashed outline, each azimuth cell is generated during a time period in which aircraft 10 travels some distance relative to ground area 14.

The radar equipment on board aircraft 10 is illustrated in FIG. 2. An antenna 16 has apertures 18 and 20. Specifically, antenna 16 is a two-dimensional array having slotted elements and a tapered radiation pattern segmented for reception purposes into two halves which comprise aperture 18 and 20 (a two-dimensional planar array). Reference is made to pages 141–146 of the treatise Introduction to Airborne Radar, by George W. Stimson, Hughes Aircraft Company 1983, the disclosure of which is incorporated fully herein by reference for further description of such an antenna. A conventional post radar transmitter 22 is connected to apertures 18 and 20. Transmitter 22 feeds radio frequency pulses to antenna 16 at a PRF, discussed in more detail below. The PRF of transmitter 22 is less than (2v/l sin $\phi$, where v is the speed of aircraft 10, l is the effective length of antenna 16, and $\phi$ is the squint angle between the direction of movement of aircraft 10 and the direction of the beam of antenna 16. As a result, normal SAR processing would produce azimuth ambiguity. Antenna 16 receives the returns of the pulses from ground area 14. Apertures 18 and 20 are connected to a conventional monopulse comparator (hybrid) 24 which produces a sum signal $\Sigma$ and a difference signal $\Delta$. The sum signal is applied to a SAR processor 26. The difference signal is applied to a SAR processor 28. SAR processors 26 and 28 comprise a conventional apparatus that processes the sum and difference signals in the manner described on pages 515–562 of the reference treatise.

SAR processor 26 generates a series of component SAR signals a(r, $\theta$) typically in digital form, representing radar returns from the respective cells of the azimuth-range gride. Similarly, SAR processor 28 generates a series of component SAR signals b(r, $\theta$) typically in digital form, representing the same radar returns from the respective cells of the azimuth-range grid. Each of the series of signals a(r, θ) and b(r, θ) comprises signals equal in number to the cells of the grid with azimuth ambiguity because the minimum PRF set forth above for conventional SAR processing is not met. The series of component signals a(r, θ) and the series of component signals b(r, θ) are additively combined in a linear adder 30, weighted in accordance with navigation data concerning the velocity and position of aircraft 10 relative to ground area 14 and the antenna characteristics. The weighing coefficients $w_a(r,\theta)$ applied to the signals generated by the SAR processor 26 and the weighing coefficients $w_b(r,\theta)$ applied to the series of signals generated by SAR processor 28 vary from azimuth increment to azimuth increment so as to selectively reject the ambiguity in the component SAR signals generated by SAR processors 26 and 28, i.e., to null out the ambiguous representations of ground area 14 returned to the radar equipment on board aircraft 10. The weighing coefficients are derived by a computer 32 on the basis of input data supplied thereto from a inertial navigation system (INS) 34 and a data storage device such as a read only memory 36. INS 34 produces time varying signals representative of the position and velocity of aircraft 10 relative to ground area 4. The signals from INS 34 are different for each azimuth increment. Data storage device 36 produces constant signals representative of the characteristics of antenna 16. The output of linear adder 30 is coupled to a display 38. Display 38 has a screen that visually presents an image representing the contour of ground area 14 in an azimuth-range grid as illustrated in FIG. 1B.

As depicted in FIG. 3, linear adder 30 comprises multipliers 40 and 42, and an adder 44. If the signals from SAR processors 26 and 28 are digital-informed, the functions of adder 30 could be carried out by a digital computer. The series of component SAR signals a (r,θ) and signals representing the corresponding coefficients $w_a(r,\theta)$ are connected to multiplier 40. The series of component SAR signals b(r,θ) and signals representing the corresponding weighing coefficients $w_b(r,\theta)$ are connected to multiplier 42. Signals representing the weighted series $w_a(r,\theta)\cdot a(r,\theta)$ and signals representing the weighted series $w_b(r,\theta)\cdot b(r,\theta)$ are applied to adder 44. Signals representing the resulting combination $w_a(r,\theta)\cdot a(r,\theta)+w_b(r,\theta)\cdot b(r,\theta)$ are presented to display 38 for visual representation on the screen.

Figure 4:
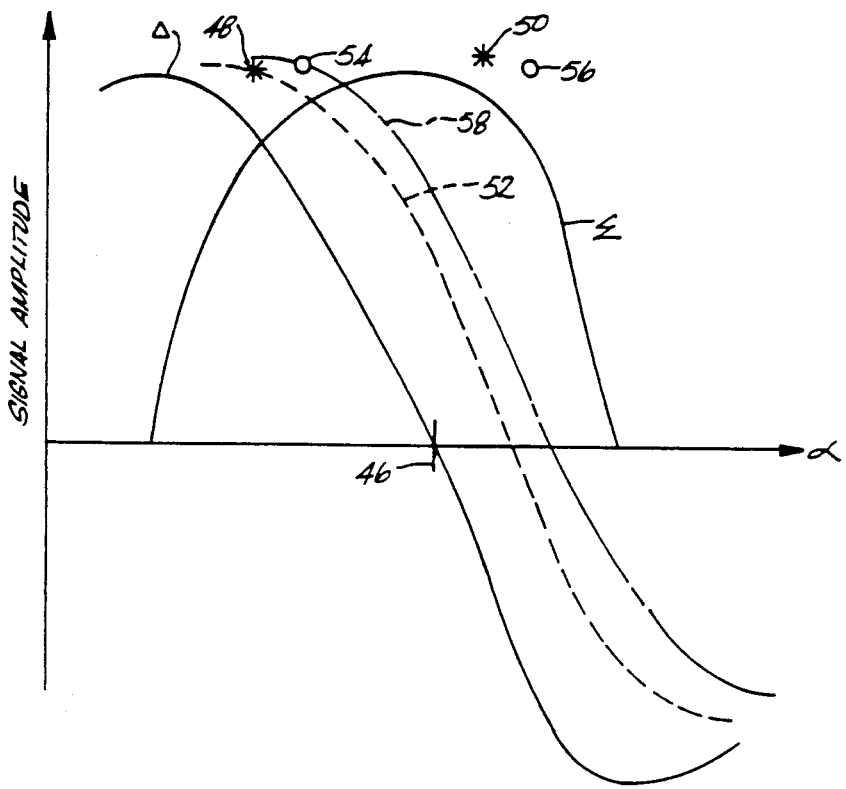
FIG. 4 is a diagram of antenna patterns used to describe the operation of the invention.

Reference is made to FIG. 4 for a description of how the weighted linear combination of the component series rejects ambiguous representations of the ground area under surveillance. A curve Σ represents the sum signal from monopulse hybrid 24 as a function of angle α off beam center of the beam of antenna 16 represented at 46. A desired representation of a particular azimuth and range cell is depicted at 48 and an ambiguous representation thereof is depicted at 50. The separation between points 48 and 50 is a function of the PRF. As the PRF gets larger, the two representations eventually merge into one, thereby eliminating the ambiguity. As indicated by a line 54, the sum and difference signals are so rated that representation 48 is preserved or enhanced and representation 50 is suppressed or nulled. During the next succeeding azimuth increment, the desired representation of the cell at the same range is represented at 54 and an ambiguous representation is represented at 56. Although spaced the same distances apart as representations 48 and 50, these representations are shifted relative to the sum and difference signals which calls for a different weighing of the sum and difference signals to preserve or enhance representation 54 and suppress or null out representation 56. Thus, the sum and difference signals are weighted so as to provide a combined signal depicted by dot-dashed line 58. Similarly, as the representations of the cells of successive azimuth increments are encountered, the weighing of the sum and difference signals is changed to, in each instance, preserve or enhance the desired representation and suppress or null out the ambiguous representation.

The described embodiment of the invention is only considered to be preferred and illustrative of the inventive concept. The scope of the invention is not to be restricted to such embodiment. Various and other numerous arrangements may be devised by one skilled in the art without departing from the spirit and scope of this invention. For example, more than two antenna apertures could be employed. In which case a further reduction in the PRF can be realized; regardless of the number of antenna apertures, a signal intercepted by each aperture is separately processed to produce a series of ambiguous SAR signals and the SAR signals are weighted and combined to suppress the ambiguous representations. In the two-aperture case disclosed herein, the sum and difference signals are selected for convenience as they are readily available in monopulse equipment. The invention could be practiced, however, employing the sub-aperture signals, if desired. The important ingredient is that signals intercepted by the plural antenna sub-apertures are separately SAR processed, weighted and linearly combined in such a manner as to suppress the ambiguities. In the two-antenna aperture case disclosed herein, the minimum PRF can be reduced to (4v/3l sin φ without incurring ambiguities. In general, the minimum PRF can be reduced by a factor of 2/N+1, where N is the number of antenna apertures.

What is claimed is:

1. A method for cancelling azimuth ambiguity in a SAR receiver obtaining radar return signals from cells of an azimuth-range grid on board a moving craft comprising the steps of:
   transmitting radar pulses toward the grid at a pulse repetition rate less than (2v)/l sin φ, where v is the speed of the craft, l is the total antenna length, and φ is a squint angle between the direction of craft motion and the direction of transmission;
   receiving on board the craft radar returns with an antenna having first and second apertures to produce corresponding first and second return signals;
   processing the first return signal over a given time period to generate a first series of component SAR signals representing radar returns from the respective cells of said azimuth-range grid;
   processing the second return signal over a given time period to generate a second series of component SAR signals representing the radar returns from the respective cells of the grid;
   additively combining the respective component signal individually weighted to produce a third signal component SAR signals representing the radar returns from the respective cells of the grid; and
   visually displaying the third series of resultant SAR signals in the form of the azimuthrange grid.

2. Apparatus for resolving azimuth ambiguity in a SAR receiver obrtaining radar return signals from cells of an azimith-range grid on board a moving craft comprising:

means for transmitting radar pulses toard the grid at a pulse repetition rate less than $(2v)/l \sin \phi$, where v is the speed of the craft, l is the total antenna length, and $\phi$ is a squint angle between the direction of craft motion and the direction of transmission;

means for receiving on board the craft radar returns with an antenna having first and second apertures to produce corresponding first and second return signals;

means for processing the first return signal over a given time period to generate a first series of component SAR signals representing radar returns from the respective cells of said azimuth-range grid;

means for processing the second return signal over the given time period to generate a second series of component SAR signals representing the radar returns from the respective cells of the grid;

means for visually displaying the third series of resultant SAR signals in the form of the azimuthrange grid.

3. A method for cancelling azimuth ambiguity in a SAR receiver obtaining radar return signals from cells on an azimuth-range grid on board a moving craft comprising the steps of:

transmitting radar pulses toward the grid at a pulse repetition rate of about $(4v/3l) \sin \phi$, where v is the speed of the craft, l is the total antenna length, and $\phi$ is a squint angle between the direction of craft motion and the direction of transmission;

receiving on board the craft radar returns with an N-antenna having first and second apertures to produce corresponding first and second return signals, with N being the number of antenna apertures;

processing the first return signal over a given time period to generate a first series of component SAR signals representing radar returns from the respective cells of said azimuth-range grid;

processing the second return signal over a given time period to generate a second series of component SAR signals representing the radar returns from the respective cells of the grid;

additively combining the respective component signal individually weighted to produce a third signal component SAR signals representing the radar returns from the respective cells of the grid, in which the first and second series, and no others, are combined to produce the third series; and visually displaying the third series of resultant SAR signals in the form of the azimuth-range grid.

4. Apparatus for resolving azimuth ambiguity in a SAR receiver obtaining radar return signals from cells of an azimuth-range grid on board a moving craft comprising:

means for transmitting radar pulses toward the grid at a pulse repetition rate of about $(4v/3l) \sin \phi$, where v is the speed of the craft, l is the total antenna length, and $\phi$ is a squint angle between the direction of craft motion and the direction of transmission;

means for receiving on board the craft radar returns with an antenna having first and second apertures to produce corresponding first and second return signals;

means for processing the second return signal over the given time period to generate a second series of component SAR signals representing the radar returns from the respective cells of the grid;

means for additively combining the respective component signals individually weighted to produce a third series of component SAR signals representing the radar returns from the respective cells of the grid in which the first and second series, and no others, are combined to produce the third series; and means for visually displaying the third series of resultant SAR signals in the form of the azimuth-range grid.

* * * * *